United States Patent

Starnes

Patent Number: 5,411,015
Date of Patent: May 2, 1995

[54] RADIATION COLLECTORS

[75] Inventor: Peter E. Starnes, Penzance, England

[73] Assignee: Collins Starnes Associates Limited, Shropshire, England

[21] Appl. No.: 116,782

[22] Filed: Sep. 3, 1993

[30] Foreign Application Priority Data

Sep. 7, 1992 [GB] United Kingdom ............ 9219012
May 6, 1993 [GB] United Kingdom ............ 9309333

[51] Int. Cl.6 .................................. F24J 3/02
[52] U.S. Cl. ............................ 126/684; 126/704; 126/711; 126/692
[58] Field of Search ............ 126/684, 704, 711, 692, 126/678, 697

[56] References Cited

U.S. PATENT DOCUMENTS 4,325,359 4/1982 Fries.

FOREIGN PATENT DOCUMENTS

1508593 4/1978 United Kingdom.
1555708 11/1979 United Kingdom.
1566900 5/1980 United Kingdom.
1574207 9/1980 United Kingdom.
2075663 11/1981 United Kingdom.

Primary Examiner—Larry Jones
Attorney, Agent, or Firm—Arnold B. Silverman; David V. Radack

[57] ABSTRACT

A solar panel (FIG. 7) comprises an extruded plastics matrix (20) comprising a plurality of side-by-side compartments each of which provides an actual fluid-flow channel without the need for providing separate metal pipework. Each compartment may include a filler (62) to define a fluid-flow channel between the upper surface of the filler and the lower surface of a membrane (28) of the matrix. The provision of the filler (62) is optional and the cross section of each compartment may be optimized to the fluid-flow channel size requirements. At least part of a surface of each fluid-flow channel has a covering comprising a solar radiation absorber; for example, the absorber may comprise a channel-shaped foil (72) which exhibits high absorbence of solar energy together with low emittance of infra-red radiation.

11 Claims, 8 Drawing Sheets

RADIATION COLLECTORS

BACKGROUND OF THE INVENTION

This invention relates to a solar panel of the type which particularly but not exclusively may be utilised for the heating of water for domestic or industrial purposes.

Solar panels which collect and utilise the energy present in solar radiation are well known. A typical known construction of solar panel comprises an array of cylindrical cross section relatively thick-walled pipes in thermal contact with a plate of heat conducting material which is coated with a radiation absorbing medium. Solar radiation incident upon such a plate is absorbed thereby resulting in an increase in its temperature and of the pipes in contact therewith. Water or other fluid flowing through the pipes is thereby heated and may be utilised either directly or indirectly for a variety of purposes.

It is known to improve the efficiency of such a solar panel by reducing the transfer back to the environment of absorbed heat energy by providing one or more cover plates over the absorber plate. Such a cover plate may be constructed of a material which is characerised by having a high transmission factor for incident solar radiation and a low transmission factor for heat radiated from the absorber plate.

It is also known to reduce the emission of heat radiation from such an absorber plate of a solar panel by the application to its surface of a selective coating which exhibits high absorption for radiation having a short wavelength typically of less than some 3 microns and which exhibits relatively low emission for radiation having longer wavelengths. Furthermore, it is well known that efficiency can be improved by reducing or eliminating heat losses from the rear and side surfaces of such solar panels by the provision of thermal insulation of conventional form.

Figure 1:
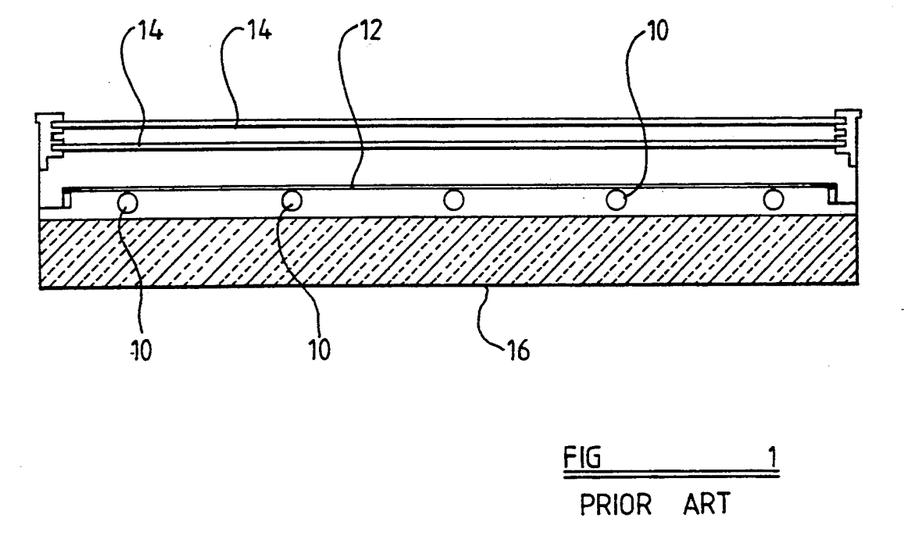
FIG. 1 is a diagrammatic side elevation of a solar panel of a typical known prior art construction.

A typical solar panel of the type known in the prior art is illustrated in FIG. 1 of the accompanying drawings. Typical dimensions for such a solar panel in which the pipes and the absorber plate are formed from copper may be as follows:

| | |
|---|---|
| internal diameter of pipe | 10.0 mm |
| wall thickness of pipe | 1.2 mm |
| spacing between centre axes of adjacent pipes | 150.0 mm |
| thickness of absorber plate | 0.5 mm |

Such known solar panels as described above can suffer from a number of disadvantages. One such disadvantage is that the cost of the absorber plate is relatively high particularly when such a plate is coated with a radiation absorbing medium. A further disadvantage is that the heat exchange surface in contact with the fluid flowing through the pipes is relatively small in comparison with the total absorbing surface of the absorber plate. For example, a section of solar panel having a total absorbing area of 30,000 $cm^2$ may only have a total heat exchange surface in contact with the fluid of 5,662 $cm^2$. A still further disadvantage is that the relatively high mass of the metal pipes and of the absorber plate results in the solar panel being of significant weight which can adversely influence the ease of installation of the panel and its location. Such a relatively high mass also represents an undesirable thermal dead load which leads to an extended warm-up time of the solar panel.

By way of example, a section of panel having a total absorbing area of 30,000 $cm^2$ as mentioned above may contain approximately 20 kg of copper in the pipes and associated absorber plate.

it is an object of the present invention to provide a new and improved solar panel which will overcome certain of the disadvantages associated with known solar panels.

SUMMARY OF THE INVENTION

In accordance with the invention there is provided a solar panel for the collection and utilisation of energy present in solar radiation comprising an array of side-by-side conduits through which a fluid to be heated by solar radiation may flow; a fluid inlet to which one end of each said conduit is connected; and a fluid outlet to which the other end of each said conduit is connected whereby fluid may flow from said inlet through said conduits to said outlet wherein each said conduit has a surface at least part of which comprises a solar radiation absorber and wherein each of the said fluid-flow conduits is provided in a plastics matrix comprising a plurality of side-by-side hollow compartments.

The plastics material of the matrix preferably exhibits high transmission properties for primary solar radiation and low transmission properties for secondary heat radiation. Such a matrix conveniently comprises an extrusion of a polycarbonate material. Said matrix conveniently comprises top and bottom membranes and webs interconnecting said membranes, said compartments being defined between opposed surfaces of adjacent webs and opposed surfaces of tile top and bottom membranes. Preferably the outer surface, i.e. that surface which is exposed to primary solar radiation, of tile top membrane of the matrix is covered by ultra-violet blocking material which may be in the form of a co-extruded lamina or may be otherwise provided.

leach of the said fluid-flow conduits may comprise a tubular member located within a said compartment of said matrix, each said tubular member being partially surrounded by a reflector contained within a said compartment. Each said tubular member conveniently extends from end-to-end of a said compartment of the matrix and is connected at each of its ends to a respective said fluid inlet and fluid outlet, each said reflector also extending from end-to-end of a respective said compartment. At least part of tile exterior surface of each said tubular member may comprise a solar radiation absorbing material, preferably a material which exhibits a high absorption of solar energy and a low emittance of infra-red radiation.

In an alternative embodiment each said fluid-flow conduit comprises one of the said compartments of the matrix. Conveniently each said compartment is provided with a tubular member at each of its ends in fluid-tight engagement therewith, each tubular member at each end of a said compartment being connected to a respective said fluid inlet and fluid outlet. Each of said compartments conveniently has a surface at least part of which is covered with a solar radiation absorbing material, such a material preferably exhibiting high absorbence of solar energy and low emittance of infra-red radiation. Each of said compartments may have at least part of its fluid contacting surface covered with a solar radiation absorbing material or at least part of its exterior surface may be covered with a solar radiation absorbing material. One or more of said compartments may be provided with a filler restricting the cross sectional area of the fluid-flow path within said compartment.

A solar panel constructed in accordance with the invention may include a fluid which has enhanced radiation absorbing properties for supplementing the effect of said radiation absorbing surface of each fluid-flow conduit.

BRIEF DESCRIPTION OF THE DRAWINGS

Other features of the invention will become apparent from the following description given herein solely by way of example with reference to the accompanying drawings wherein.

DESCRIPTION OF THE PREFERRED EMBODIMENTS

FIG. 1 of the accompanying drawings illustrates a solar panel of a typical known prior art construction. Such a panel comprises a plurality of metal, usually copper, relatively thick-walled pipes 10 typically of 1.2 mm wall thickness arranged in a parallel side-by-side array with the upper surfaces of each pipe in contact with the undersurface of a metal, usually copper, absorber plate 12. The upper surface of the absorber plate may be provided with a selective coating exhibiting high absorption characteristics for radiation having a short wavelength and relatively low emission characteristics for radiation having longer wavelengths. Such a prior art solar panel is also typically provided with one or more cover plates 14 over the absorber plate 12, the or each cover plate 14 being formed from a material characterised by having a high transmission factor for incoming incident solar radiation and a low transmission factor for outgoing emitted heat radiation. As illustrated in FIG. 1, the assembly of cover plates 14, absorber plate 12 and fluid-flow pipes 10 is mounted on a collector box 16 filled with a thermally insulating material.

A solar panel constructed as shown in FIG. 1 is heavy since at least the absorber plate 12 and the pipes 10 are all made of metal. Furthermore, the pipes containing the fluid to be heated by solar radiation are not exposed directly to such radiation, the fluid flowing within the pipes being heated primarily by conduction from the absorber plate 12.

Figure 2:
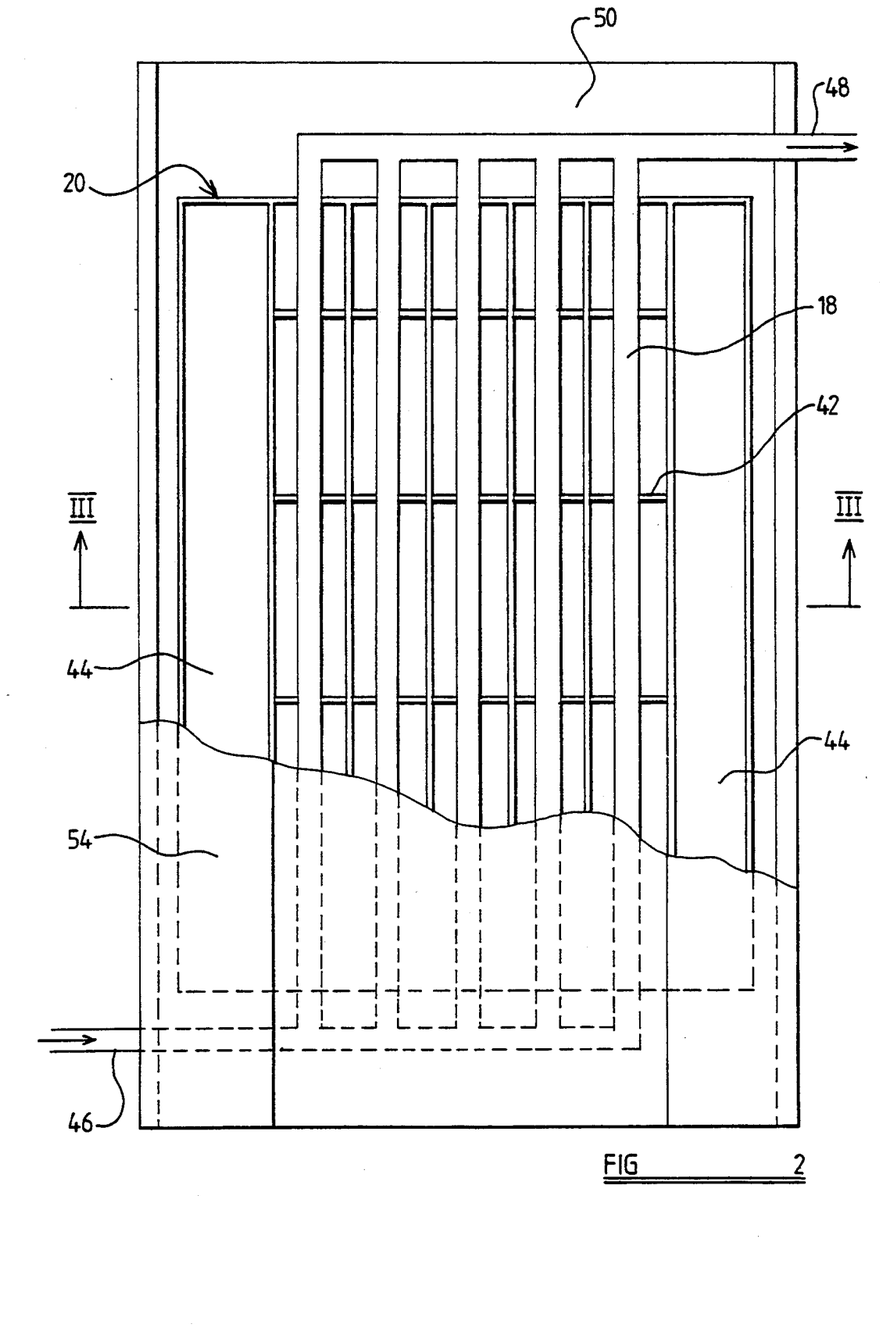
FIG. 2 is a part cut-away top plan view of a solar panel constructed in accordance with the invention.
Figure 3:
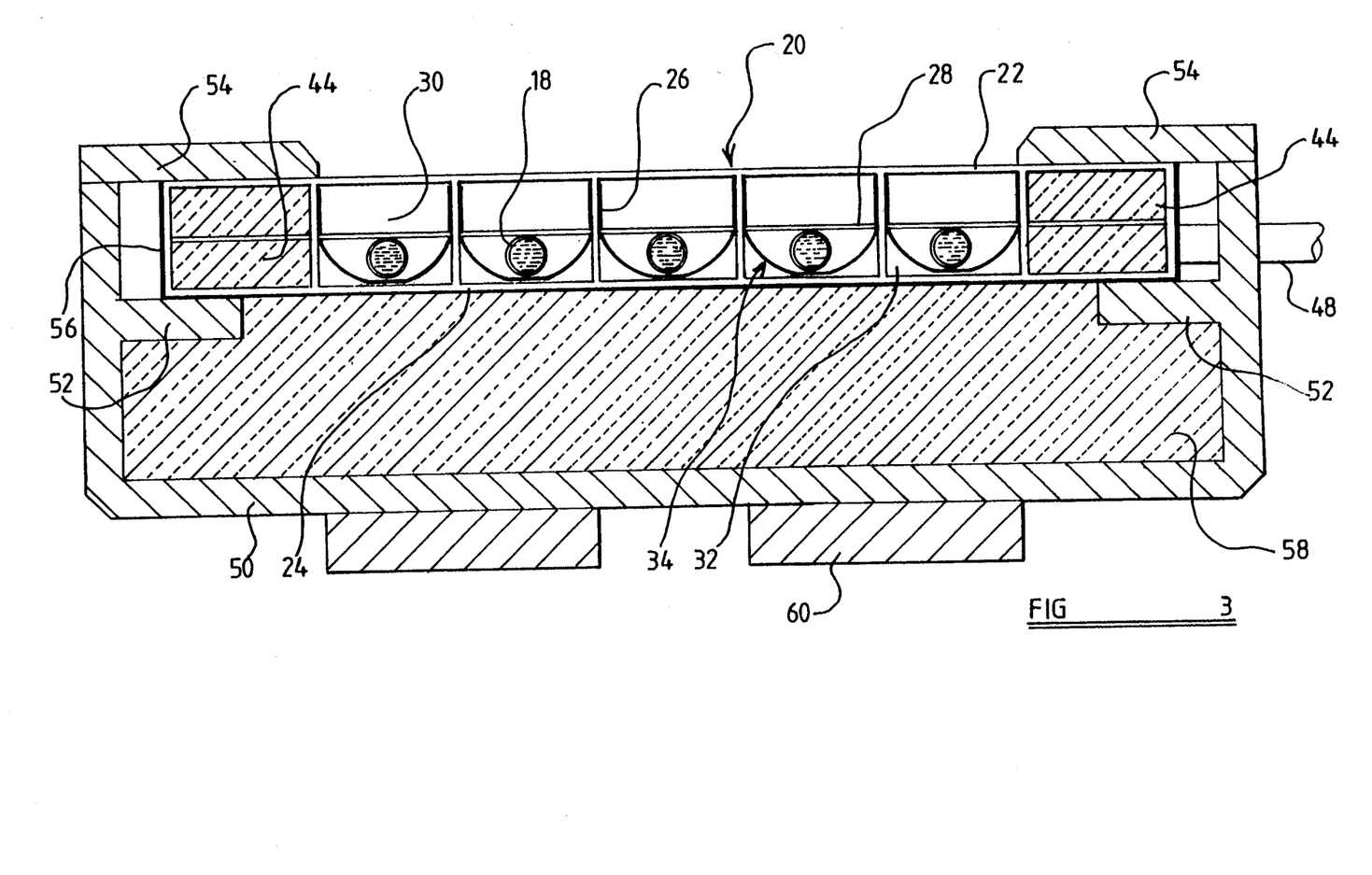
FIG. 3 is a transverse cross-sectional view on the line III—III of the solar panel of FIG. 2.
Figure 4:
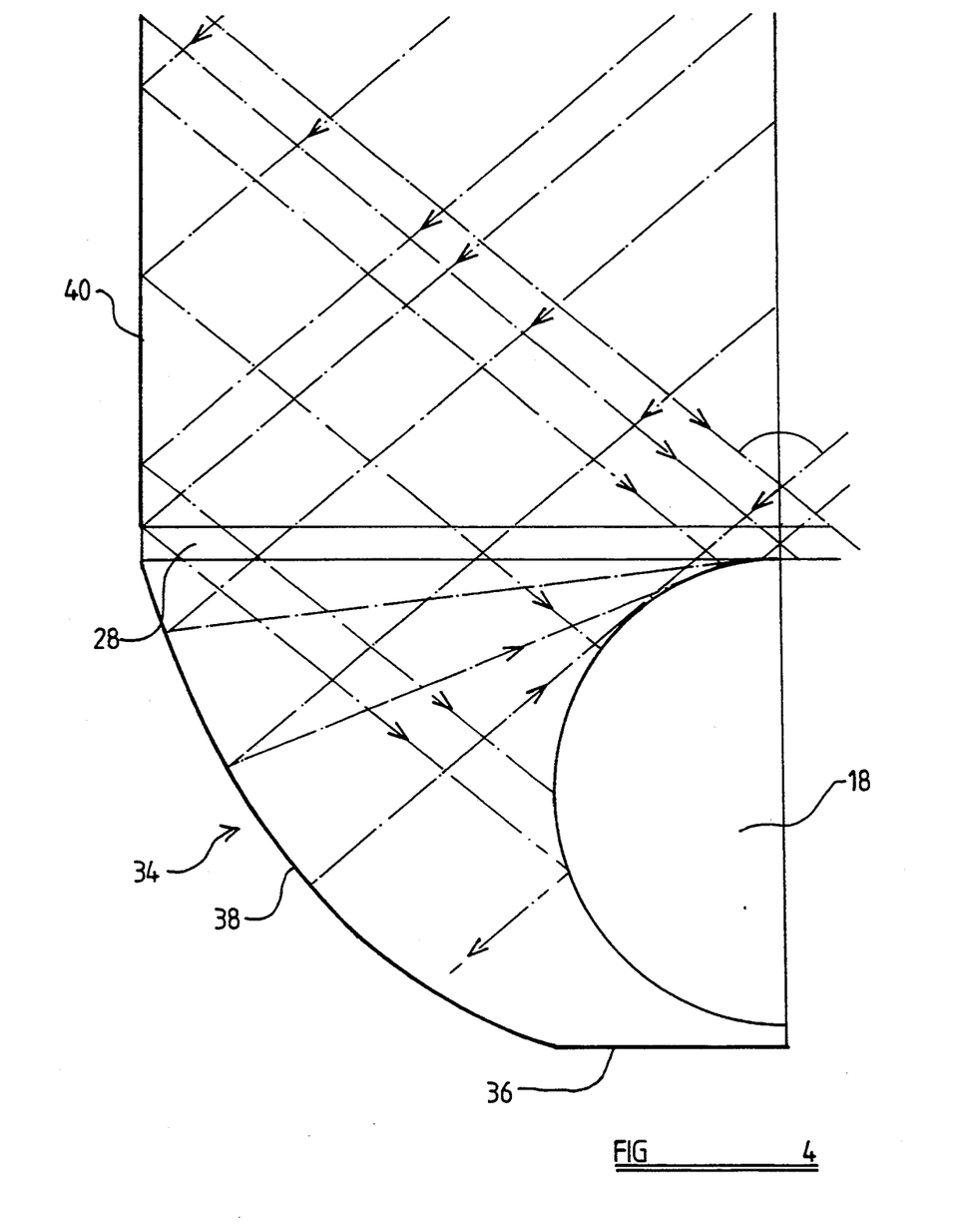
FIG. 4 is an end elevation to an enlarged scale of part of one of the reflector elements of the panel of FIGS. 2 and 3.

A first embodiment of solar panel constructed in accordance with the present invention is illustrated in FIGS. 2 to 4. Referring firstly to FIGS. 2 and 3, there is shown a solar panel of substantially rectangular plan form comprising an array of parallel side-by-side fluid-flow conduits in the form of thin-walled hollow pipes 18 located in an extruded plastics matrix 20 providing a plurality of parallel side by side compartments. As is best seen with reference to FIG. 3, the matrix 20 comprises a top membrane 22, a bottom membrane 24 and a plurality of interconnecting webs 26 thereby to define a plurality of side-by-side compartments. In the embodiment illustrated in FIGS. 2 and 3 seven such side-by-side compartments are shown by way of example. An intermediate membrane 28 is extruded integral with the matrix whereby each of the said compartments is divided into an upper and lower sub-compartment 30 and 32 respectively although the formation of such sub-compartments by the provision of an intermediate membrane 28 is not essential. The outer surface of the top membrane 22 is preferably covered by an ultra-violet blocker (not illustrated) which is conveniently in the form of a covering lamina co-extruded with the remainder of the matrix.

Figure 5:
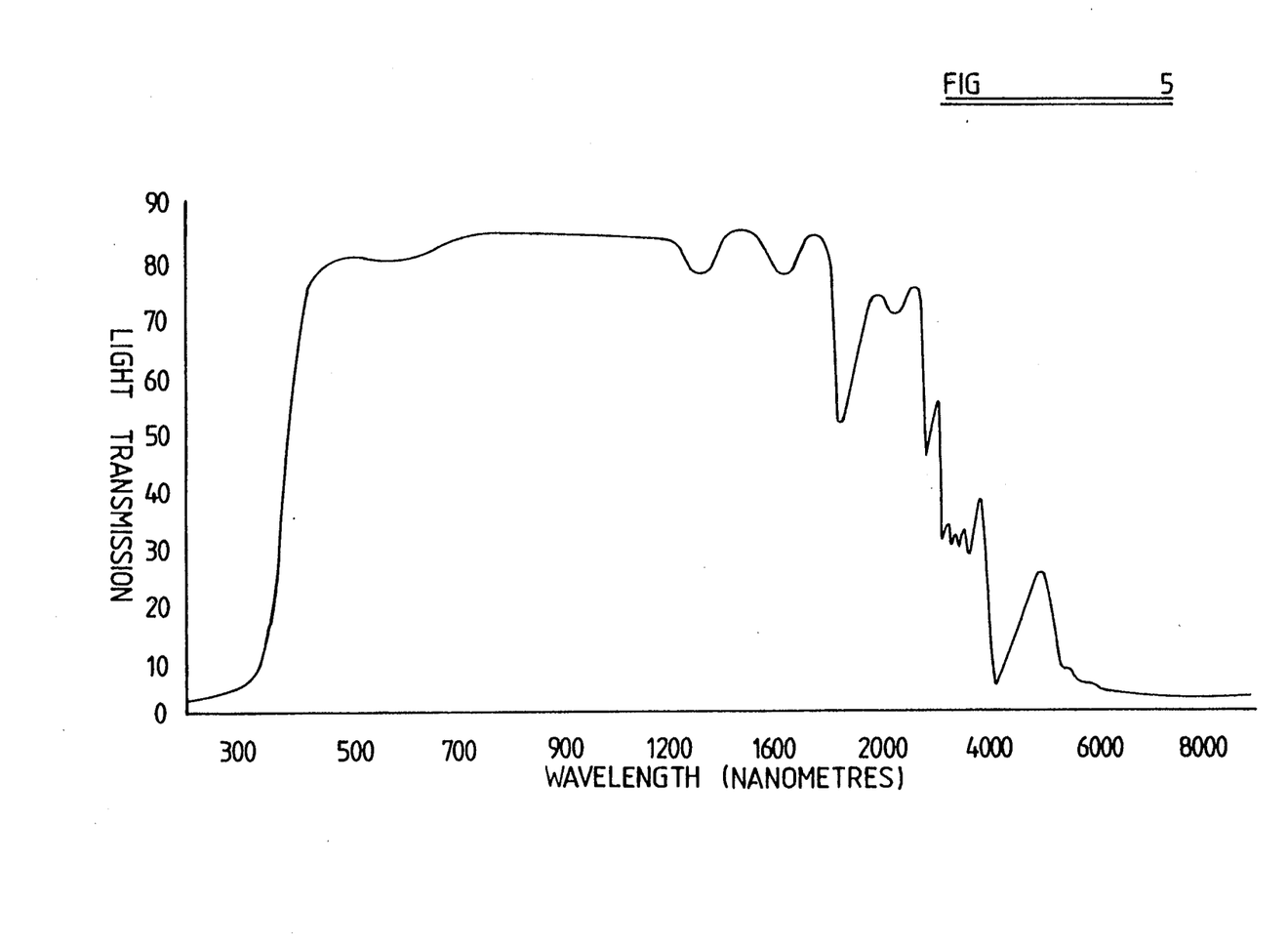
FIG. 5 is a spectral transmission graph of polycarbonate sheet as used in the construction of the panel of FIGS. 2 to 4.

The matrix 20 is formed as an extrusion from a polycarbonate material which exhibits the type of spectral transmission characteristics as shown in the graph of FIG. 5. Such a polycarbonate material combines high strength with high transmission properties for primary solar radiation and low transmission properties for secondary heat radiation. In the embodiment of FIGS. 2 and 3 each fluid-flow conduit of the solar panel comprises a said pipe 18 conveniently formed of copper and located within and extending from end-to-end of an associated lower sub-compartment 32. A reflector 34 is mounted in each compartment so as partially to surround each pipe 18 whereby incident solar radiation falling upon the top membrane 22 of the matrix will impinge directly upon the upper surfaces of each pipe 18 and also be reflected onto its lower surfaces. Part of one of the reflectors 34 is shown in more detail in FIG. 4 from which it will be seen that in each of the lower sub-compartments 32 there is provided a lower reflector part of generally parabolic cross-section comprising a generally flat base 36 of a width approximating the diameter of the associated pipe 18 and curved sides 38. Generally flat upper reflector parts 40 are located adjacent the opposed side walls of each upper sub-compartment 30.

The lower reflector part 36–38 is supported within the lower sub-compartment 32 by means of appropriately shaped formers (not shown) located below the reflector whilst each pipe 18 is supported relative to the reflector by longitudinally spaced apart formers 42 located above tile lower reflector part 36–38. It will be appreciated that the transmission characteristics of the membranes 22 and 28 of the matrix 20 enable solar radiation to be transmitted therethrough whereby, as is illustrated in FIG. 4, both the upper and lower reflector parts enable the radiation to impinge on the lower surfaces of the pipe 18 as indicated by the arrows.

At least a part of the exterior surface of each pipe 18 comprises a solar radiation absorbing material. Such a material may simply comprise a black matt paint on the exterior surface of each pipe although it is preferred to utilise a coating in the form of a foil which exhibits high absorbence of solar energy together with low emittance of infra-red radiation. Such a foil which also has a high resistance to humidity and thermal degradation may be of the type distributed under the trade name MAXORB by the Inco Group of companies.

As illustrated in FIGS. 2 and 3 five thin-walled fluid-flow pipes 18 are provided in five of the seven compartments, the two outermost said compartments being filled with a thermally insulating material 44. Each of the pipes 18 and its associated reflector 34 extend from end-to-end of each associated compartment with all of the ends of the pipes at one end of the panel being connected to a fluid inlet header 46 and all of the ends of the pipes at the other end of the panel being connected to a fluid outlet header 48 as may be clearly seen from FIG. 2. Thus a fluid which is to be heated, which may typically be water, may be introduced into the fluid inlet header 46 to flow through all of the pipes 18 and out of the panel by means of the fluid outlet header 48.

The plastics matrix 20 together with its pipes 18, reflectors 34 and headers 46, 48 is conveniently mounted in a weatherproof thermally insulating housing as may be particularly clearly seen from FIG. 3. The housing conveniently comprises a plastics extrusion having a base 50 and opposed inwardly directed flanges 52 on which the plastics matrix 20 may be located. Retaining flanges 54 secured to the housing retain the matrix 20 in place. Conveniently a heat reflecting metallic foil 56 is wrapped around the external side edges of the matrix and underneath it so as to rest upon the flanges 52 of the housing. The remainder of the housing is packed with a thermally insulating material 58 and may include exterior supporting pads 60 or lugs or the like enabling mounting of the panel in a suitable position.

It will be appreciated that such a solar panel constructed as described with reference to FIGS. 2 to 4 will be extremely light in weight compared with the type of solar panel described with reference to FIG. 1. Also, such a solar panel is capable of receiving incident solar radiation directly upon its fluid-flow conduits unlike the panel of FIG. 1 which relies upon incident radiation being absorbed by the absorber plate for conduction to the fluid in the fluid-flow pipes.

Typical dimensions for a solar panel of the type illustrated in FIGS. 2 and 3 may be as follows:

| | |
|---|---|
| internal diameter of each pipe 18 | 5.24 mm |
| wall thickness of each pipe 18 | 0.56 mm |
| spacing between centre axes of adjacent pipes 18 | 20.00 mm |

A nominal three square meter section of solar panel constructed as illustrated in FIGS. 2 and 3 with the above dimensions will exhibit the following characteristics:

| | |
|---|---|
| total absorbing area | 29,571 cm$^2$ |
| fluid contact area | 24,364 cm$^2$ |
| total weight of copper pipes | 13.53 kg |

From these figures it will be observed that for a given area the solar panel of the invention has essentially the same absorber surface area as that of a prior art panel of the type illustrated in FIG. 1 but has more than four times the fluid contact surface than that of the FIG. 1 type of panel. Since the rate of heat transfer to the fluid is proportional to the area of the contact surface it will be appreciated that the rate at which heat is gained by the fluid will be substantially greater in the case of a panel manufactured in accordance with the invention than is the case with a panel of the prior art type. It will also be appreciated that the weight of metal in the panel of the invention is substantially less than that of the prior art type of panel.

In use, one or more solar panels in accordance with the invention would be installed in an unshaded situation and tilted so as to receive the maximum flux of direct solar radiation during the summer months and orientated so that its fluid-flow pipes 18 run more or less east to west.

Each panel would be in communication by means of suitable conduits with a water circulation and storage system of conventional design. Water or other liquid to be heated would be introduced into each panel from such a system via said conduits, air being removed at the commencement of working by conventional venting means.

The liquid in the system would be circulated one or more times through each solar panel of the invention by means of a pump or under the influence of convection and would thereby be heated by the transfer of solar energy collected by the absorbing surface of the pipes 18. If convection is used, the system would preferably be configured so that each panel is located below the hot water storage vessel, each panel being tilted so that the water in the heating conduits flows upwards at a gradient of some 10 to 15 degrees from the horizontal.

When a panel in accordance with the invention is installed in the configuration hereinbefore described the reflecting surfaces of the reflectors 34 provide a wide angle of acceptance and ensure a high utilisation of available solar radiation throughout the daylight hours as is indicated in FIG. 4. Moreover, because of the short reflection paths involved, small imperfections in the reflective surfaces of the reflectors 34 have little or no effect upon the efficiency of radiation collection. In this regard, solar panels constructed in accordance with the invention are clearly distinguishable from those types of conventional arrays of solar collectors having reflectors usually of parabolic shape and having apertures of the order of 10 cm or more. Such arrays are used in general to generate temperatures in excess of 100° C. for industrial purposes. They commonly employ sophisticated evacuated radiation absorption devices and require a high degree of precision in their manufacture. This necessity arises because of the critical influence of the configuration of the reflector surface upon efficiency due to the long reflection paths and relatively small target areas involved. These factors lead to high cost, high weight and a tendency for performance to diminish with time as components age.

In contrast, panels made according to the present invention are intended primarily for use in applications where the temperature of the working liquid is less than 100° C. and are characterised by their low cost, light weight and freedom from deterioration due to ageing.

Figure 6:
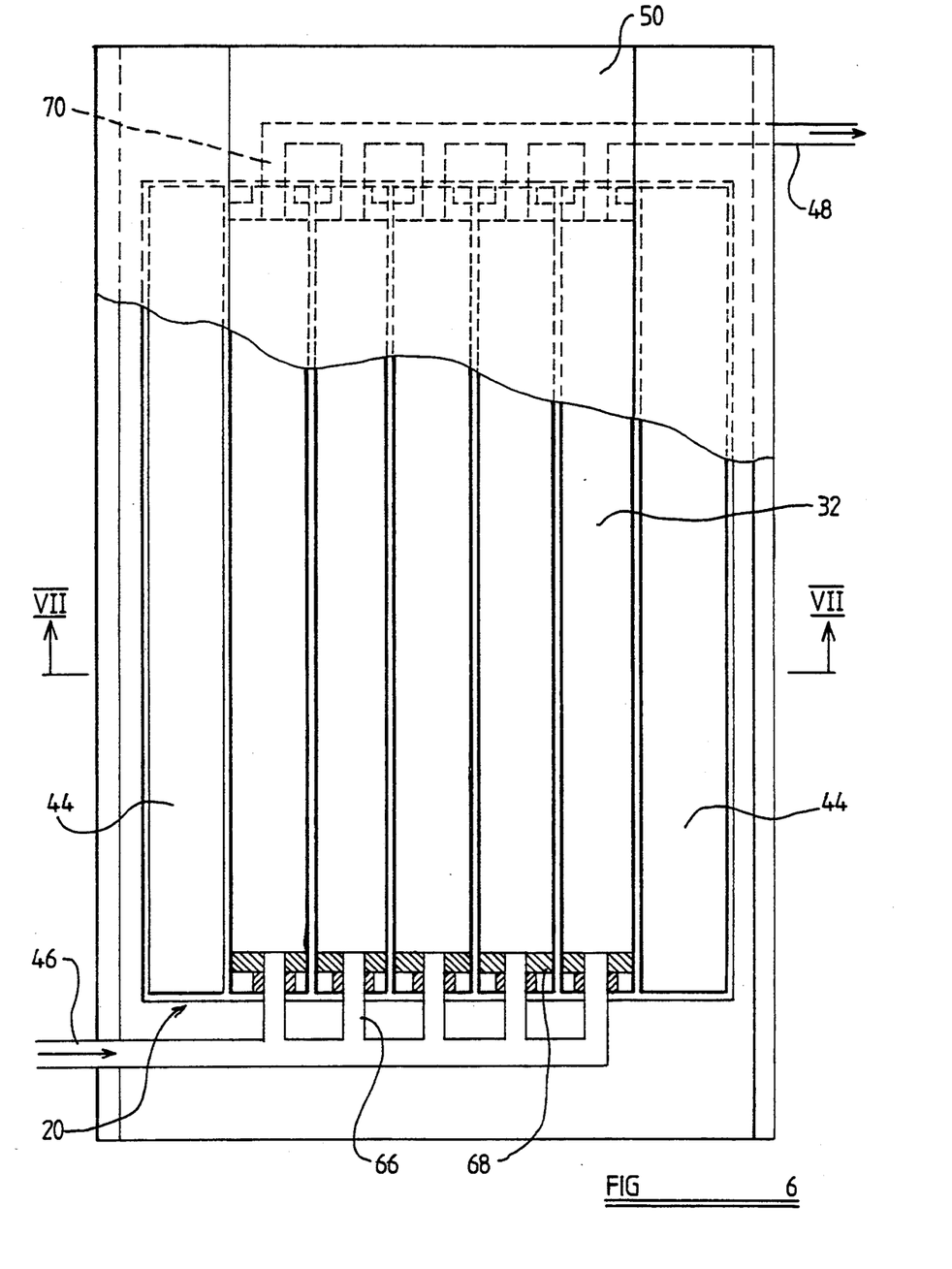
FIG. 6 is a part cut-away top plan view of a further embodiment of solar panel constructed in accordance with the invention.
Figure 7:
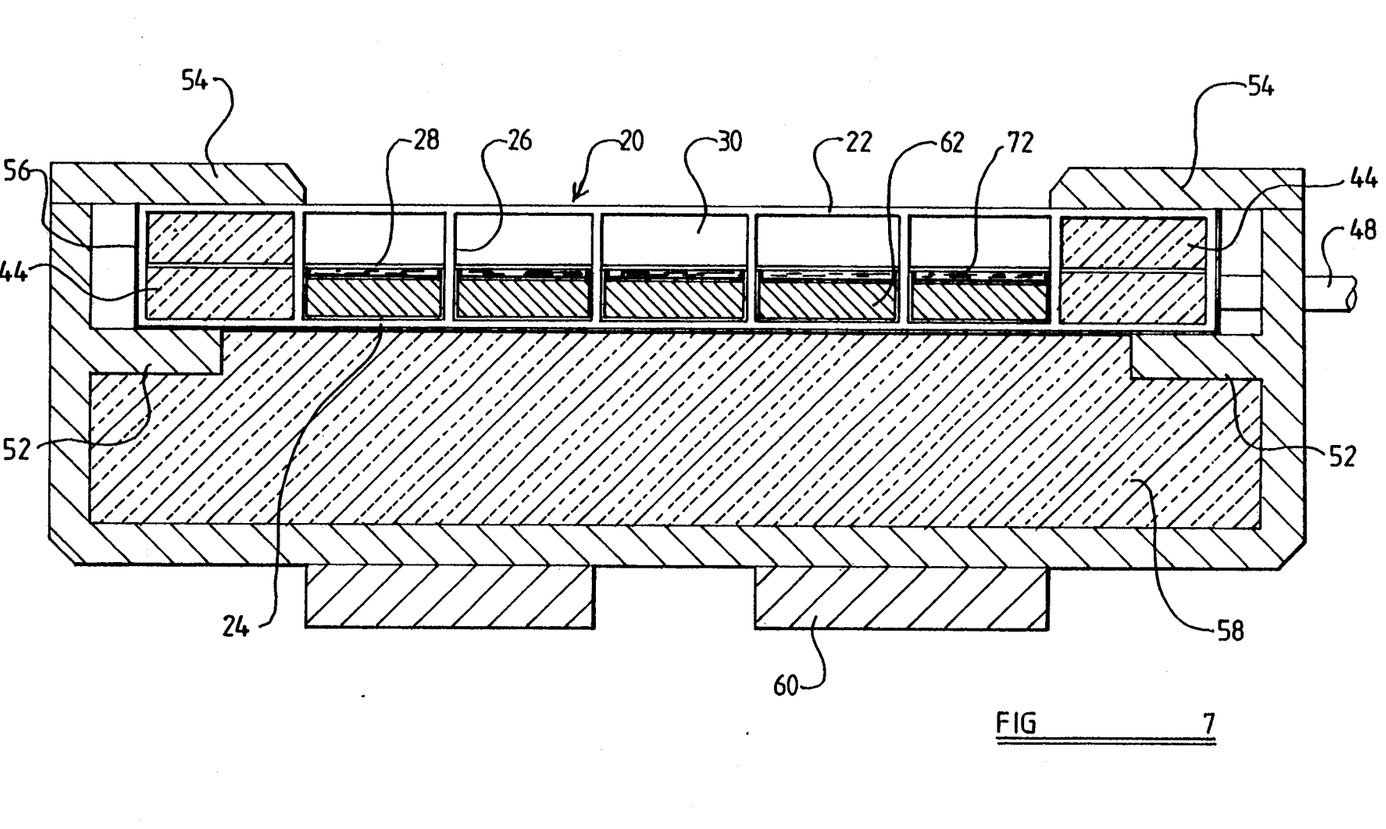
FIG. 7 is a transverse cross-sectional view on the line VII—VII of the panel of FIG. 6.
Figure 8:
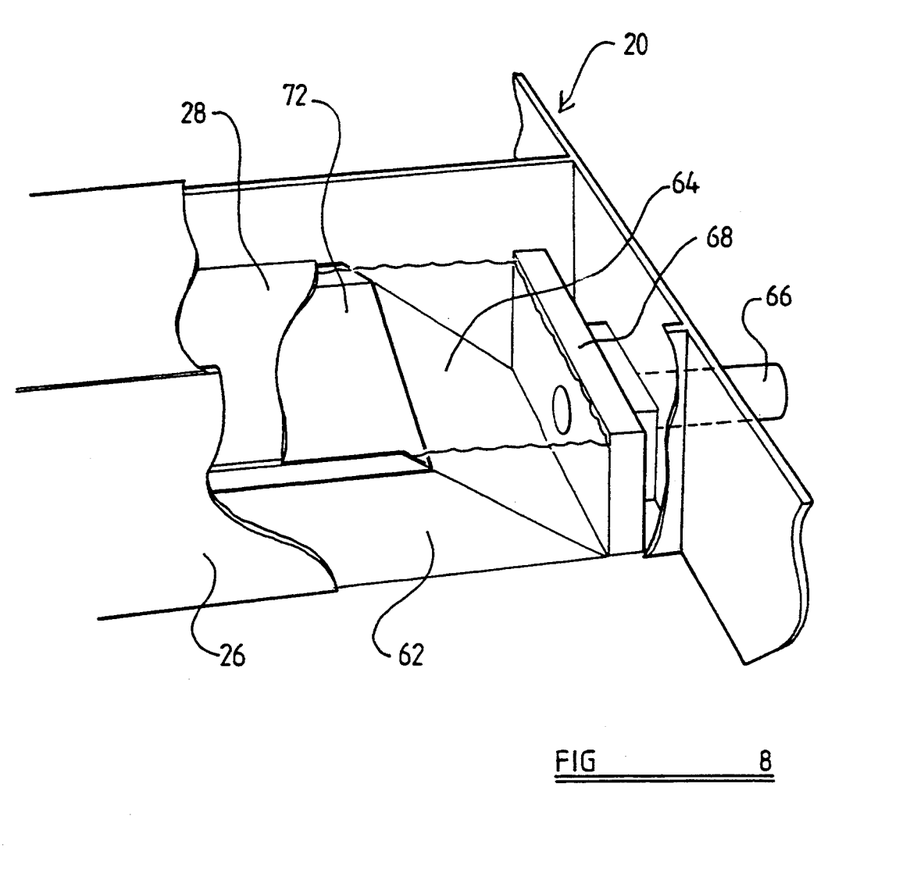
FIG. 8 is a detail to an enlarged scale of the end of one of the fluid-flow conduits of the panel of FIGS. 6 and 7.

A further embodiment of solar panel constructed in accordance with the invention is illustrated in FIGS. 6 to 8 of the drawings wherein like reference numerals refer to like parts hereinbefore described. In this embodiment an extruded polycarbonate plastics matrix 20 is provided similar to that described and illustrated with reference to the embodiment of FIGS. 2 and 3 but in the embodiment of FIGS. 6 to 8 each compartment of the matrix may itself comprise the fluid-flow conduit of the solar panel. Thus in similar manner to the matrix described with reference to FIGS. 2 to 4, the matrix 20 of the present embodiment comprises a top membrane 22, a bottom membrane 24 and a plurality of interconnecting webs 20 thereby defining a plurality of side-by-side compartments. As illustrated, seven such side-by-side compartments are shown by way of example. An intermediate membrane 28 is extruded integral with the matrix 20 whereby each of the said compartments is divided into an upper and lower sub-compartment 30 and 32 respectively although the formation of such sub-compartments by the provision of an intermediate membrane 28 is not essential. The outer surface of the top membrane 22 is preferably covered by an ultra-violet blocker (not illustrated) which is conveniently in the form of a covering lamina co-extruded with the remainder of the matrix.

The matrix 20 is formed as an extrusion from a polycarbonate material which exhibits the type of spectral transmission characteristics as shown in the graph of FIG. 5. Such a polycarbonate material combines high strength with high transmission properties for primary solar radiation and low transmission properties for secondary heat radiation. In the present embodiment of FIGS. 6 to 8 the five centre compartments of the matrix comprise the actual fluid-flow conduits. Referring particularly to FIGS. 7 and 8, each of the lower subcompartments 32 of the five central compartments of the matrix is provided with an internal filler 62 which is secured by an adhesive within tile sub-compartment and has an upper surface thereof located a small distance, of the order of between 2 mm and 10 mm, below the lower surface of the intermediate membrane 28. Each end of the filler is tapered as at 64 (see FIG. 8) whereby liquid may be introduced into tile space between tile upper surface of the filler 62 and the under surface of the intermediate membrane 28 in each sub-compartment 32 through an inlet pipe 66 for each compartment. Each inlet pipe 66 is secured in fluid-tight engagement within the end of an associated lower sub-compartment 32 by means of an apertured end closure 68, the fluid-tight securement being conveniently effected by an adhesive. A similar outlet pipe arrangement 70 is provided at the other end of each lower sub-compartment 32. On the upper surface of the filler 62 in each lower sub-compartment 32 there is provided a solar radiation absorbing material which conveniently comprises a foil 72 formed into channel section as illustrated in FIG. 8, such a foil conveniently being one which exhibits high absorbence of solar energy with low emittance of infra-red radiation. A foil of this type is distributed by the Inco Group of companies under tile name MAXORB.

All of the pipes 66 at one end of the matrix 20 are connected to a fluid inlet header 46 and all of the pipes 70 at the other end of the matrix are connected to a fluid outlet header 48 its illustrated in FIG. 6 whereby fluid may enter and flow through that part of each lower sub-compartment of tile matrix defined between the opposed side walls of tile foil 72, the upper surface of the foil and the lower surface of the intermediate membrane 28.

The opposed side walls of the upper sub-compartments 30 may be provided as reflective surfaces such as for example by being coated with an anodised aluminium. Such reflective surfaces reduce radiated heat losses from the panel whilst also increasing the effective acceptance angle for incoming radiation.

The plastics matrix 20 together with its inlet and outlet pipes and headers is conveniently mounted in a similar type of weatherproof thermally insulating housing as described with reference to the first embodiment. Thus the housing, which is clearly shown in FIG. 7, comprises a plastics extrusion having a base 50 and opposed inwardly directed flanges 52 on which the plastics matrix 20 may be located. Retaining flanges 54 secured to the housing retain the matrix 20 in place. Conveniently a heat reflecting metallic foil 56 is wrapped around the external side edges of the matrix and underneath it so as to rest upon the flanges 52 of the housing. The remainder of the housing is packed with a thermally insulating material 58 and may include exterior supporting pads 60 or lugs or the like enabling mounting of the panel in a suitable position. Also, in similar manner to that illustrated and described with reference to the first embodiment, the outer two compartments of the matrix 20 are filled with a thermally insulating material 44 and do not comprise fluid-flow conduits.

Typical dimensions for a panel manufactured according to the embodiment of the invention described above with reference to FIGS. 6 to 8 are as follows:

| Fluid-flow channel in matrix | 19.0 mm × 8 mm |
|---|---|
| Matrix vertical web thickness | 0.8 mm |

A three square meter section of panel manufactured according to the invention with the above dimensions will exhibit the following characteristics:

| Area of absorbing surface | 52,500 cm² |
|---|---|
| Volume of liquid contained in channels | 22.8 litres |
| Factor for contained liquid volume divided by absorbing surface | 4.43 l/m² |

By way of comparison a three square meter section of panel manufactured according to the first embodiment of FIGS. 2 to 4 may typically exhibit a total absorbing area of the order of 29,500 cm² with a volume of liquid contained within the conduits of some 3.2 liters, giving a ratio of liquid volume divided by absorbing surface of 1.10 l/m².

Thus the ratio of contained liquid volume to absorbing surface is some four times greater in the panel of the FIGS. 6 to 8 embodiment than for the embodiment of the invention described with reference to FIGS. 2 to 4.

A solar panel having a large ratio of liquid volume to absorbing surface is suitable for use in conditions where the level of insulation is high and a large volume of water at a relatively low temperature is required but for use in a temperate climate a lower ratio of liquid volume to absorbent surface area may be more appropriate.

The depth of the fluid-flow channel in each sub-compartment may be varied by providing differing thicknesses of filler 62 and a different set of dimensions for a panel manufactured according to the embodiment of FIGS. 6 to 8 may be as follows:

| Flow channel cross section | 19.0 mm × 2 mm |
|---|---|
| Matrix vertical web thickness | 0.8 mm |

A three square meter section of such a panel may exhibit the following characteristics:

| Area of absorbing surface | 34,500 cm² |
|---|---|
| Volume of liquid contained in channels | 5.70 liters |

| | |
|---|---|
| Factor for contained liquid volume divided by absorbing surface | 1.63 l/cm² |

It will be understood that by varying the shapes of the fillers 62 the cross sections of the flow channels may be easily altered so as to yield ratios of liquid volume to absorbing surface area of widely different values. This facility permits solar panels to be designed and manufactured to meet the requirements of different applications with maximum efficiency. It will also be understood that not only does heat transfer to tile working fluid take place over the whole area of the absorbing surfaces but also by direct interaction between the fluid and radiation traversing the flow paths. This radiation may be solar radiation incident upon the panel or secondary radiation emitted or reflected from the walls of the flow channels.

In the embodiment described and illustrated with reference to FIGS. 6 to 8 the matrix 20 is provided with upper and lower sub-compartments 30 and 32 with fillers 62 in the lower sub-compartments 32 defining the cross-section of the actual fluid-flow channel. However, it should be appreciated that such fillers 62 may also be provided in a compartment if the intermediate membrane 28 is not present, the fluid-flow channel then being defined between the upper surface of each filler and the under surface of the top membrane 22. Furthermore, the matrix 20 may be formed to define side-by-side fluid-flow compartments of the required optimum dimensions whereby the provision of a filler in each compartment or sub-compartment will not be necessary. In such a construction the solar radiation absorbing surface for each fluid-flow conduit of the panel may comprise a suitable coating or covering underneath tile under surface of the bottom membrane 24 of the matrix but above the heat reflecting foil 56. Such an absorbing surface may conveniently comprise the same MAX-ORB type of foil as described above.

The cost and weight of solar panels are two important factors which determine the economics of solar heating systems, the latter being significant because of its influence upon installation costs. The collector designs and methods of energy collection hereinbefore disclosed permit efficient utilisation of solar energy for the production of heated water or other fluids in a wide range of applications by the employment of collectors in the form of solar panels which are especially characterised by their low cost and light weight.

When used for the production of hot water, a panel of the form hereinbefore described is installed in an unshaded situation with its active surface tilted so as to receive the maximum flux of direct solar radiation during the summer months: the preferred orientation being with tile headers parallel to the ground and the direction of liquid flow within tile panel being from the bottom header to the top one. Said panel is in communication by means of conduits with a water circulation and storage system of conventional design which may operate under the influence of natural convection or be driven by a pump as described with reference to the first embodiment.

It will be understood that the invention hereinbefore described is not restricted to application in circumstances where the working fluid is water. Other liquids or aqueous solutions having lower freezing points and higher boiling points can sometimes be employed with advantage as is well known in the art relating to conventional solar panels.

In the present case there also exists the possibility of using a fluid which absorbs radiation relatively strongly. Such a fluid can be produced by the addition of appropriate dyes or finely divided pigments to an aqueous medium. A fluid of this form may be used to supplement the absorption effected by the surfaces lining the flow paths as hereinbefore described.

The features disclosed in the foregoing description, or the following claims, or tile accompanying drawings, expressed in their specific forms or in terms of a means for performing tile disclosed function, or a method or process for attaining the disclosed result, as appropriate, may, separately or in any combination of such features, be utilised for realising the invention in diverse forms thereof.

I claim:

1. A solar panel for the collection and utilization of energy present in solar radiation comprising an array of side-by-side metal conduits through which a fluid to be heated by solar radiation may flow, each of said conduits being partially surrounded by a reflector; a fluid inlet to which one end of each said conduit is connected; and a fluid outlet to which the other end of each said conduit is connected whereby fluid may flow from said inlet through said conduits to said outlet wherein each said conduit has a surface which comprises a solar radiation absorber and wherein each said fluid-flow conduit is provided in a plastics matrix comprising a plurality of side-by-side hollow compartments.

2. A solar panel as claimed in claim 1 wherein the plastics material of the matrix exhibits high transmission properties for primary solar radiation and low transmission properties for secondary heat radiation.

3. A solar panel as claimed in claim 1 wherein said plastics matrix comprises an extrusion.

4. A solar panel as claimed in claim 3 wherein an ultra-violet blocking lamina is co-extruded with the matrix to cover an outer surface thereof.

5. A solar panel as claimed in claim 1 wherein said plastics matrix comprises an extrusion of a polycarbonate material.

6. A solar panel as claimed in claim 1 wherein said matrix comprises top and bottom membranes and webs interconnecting said membranes, said compartments being defined between opposed surfaces of adjacent webs and opposed surfaces of the top and bottom membranes.

7. A solar panel as claimed in claim 1 wherein each said tubular member extends from end to end of a said compartment of the matrix and is connected at each of its ends to a respective said fluid inlet and fluid outlet, each said reflector also extending from end to end of a respective said compartment.

8. A solar panel as claimed in claim 1 wherein at least part of the exterior surface of each said tubular member comprises a solar radiation absorbing material.

9. A solar panel as claimed in claim 1 wherein the fluid has enhanced radiation absorbing properties for supplementing the effect of said radiation absorbing surface of each fluid-flow conduit.

10. A solar panel as claimed in claim 1 wherein each of said reflectors comprises a substantially parabolic surface and is located so as to reflect solar radiation incident upon the said panel from within a wide acceptance angle onto the surface of a respective said metal conduit.

11. A solar panel for the collection and utilization of energy present in solar radiation comprising an array of side-by-side conduits through which a fluid to be heated by solar radiation may flow; a fluid inlet to which one end of each said conduit is connected; and a fluid outlet to which the other end of each said conduit is connected whereby fluid may flow from said inlet through said conduits to said outlet wherein each said conduit has a surface at least part of which comprises a solar radiation absorber, wherein each said fluid-flow conduit is provided in a plastics matrix comprising a plurality of side-by-side hollow compartments, wherein each said fluid-flow conduit comprises at least a part of one of said compartments of said matrix and wherein one or more of said compartments is provided with a filler restricting the cross-sectional area of the fluid-flow path within said compartment.

* * * * *

UNITED STATES PATENT AND TRADEMARK OFFICE
CERTIFICATE OF CORRECTION

PATENT NO. : 5,411,015
DATED : May 2, 1995
INVENTOR(S) : Peter E. Starnes

It is certified that error appears in the above-indentified patent and that said Letters Patent is hereby corrected as shown below:

```
    In column 2, lines 33, 35 and 48; column 4, line 54;
column 5, lines 4 and 16; column 6, lines 2 and 3;
column 7, lines 33, 56 and 57; and column 9, lines 13,
36, 56 and 57, "tile" should be --the--.

Column 2, line 39, "leach" should read --Each--.

Column 6, line 30, the comma "," should be deleted.

Column 7, line 3, "webs 20" should be --webs 26--.

Column 7, line 54, "its" should be --as--.
```

Signed and Sealed this

Fifth Day of March, 1996

Attest:

BRUCE LEHMAN

*Attesting Officer*      *Commissioner of Patents and Trademarks*